Dec. 12, 1933.                G. L. CHERRY                1,939,041
                        APPARATUS FOR SHEATHING CORES
                        Original Filed April 6, 1929
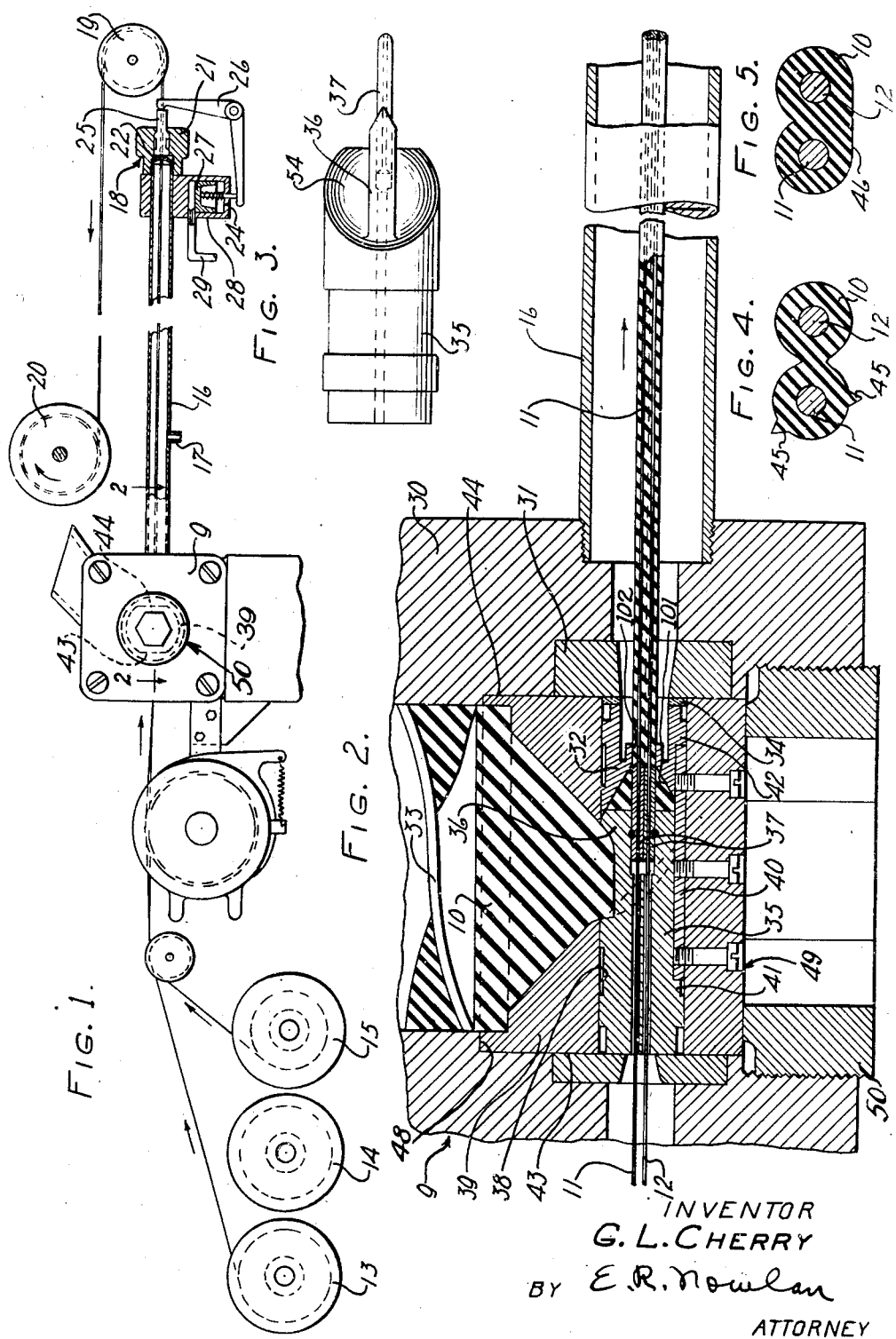

Patented Dec. 12, 1933

1,939,041

UNITED STATES PATENT OFFICE 1,939,041

APPARATUS FOR SHEATHING CORES

George L. Cherry, La Grange, Ill., assignor to Western Electric Company, Incorporated, New York, N. Y., a corporation of New York Original application April 6, 1929, Serial No. 353,042. Divided and this application May 16, 1930. Serial No. 452,855

10 Claims. (Cl. 18—13)

This invention relates to apparatus for sheathing cores, and more particularly to apparatus for extruding a plastic covering upon cores in strand form, and is a division of my Patent No. 1,823,885, dated September 22, 1931.

An object of the invention is to provide a simple, inexpensive and efficient apparatus for sheathing cores.

In accordance with one embodiment of the invention, there is provided in an apparatus for applying a vulcanized rubber covering upon one or more wires or conductors, an extrusion head for extruding the covering material upon the wires and a heated chamber for vulcanizing the covering. The extrusion head is constructed and designed so as to insure the proper locating and positioning of a floating extrusion die and a cooperating core tube assembly therein. The extrusion die communicates with the vulcanizing chamber through an apertured entrance plate and an aperture in the extrusion head block. The die is yieldingly urged toward the plate by the pressure of the covering material being extruded, whereby the die cooperates with the plate and a gasket interposed therebetween to provide a seal between the die and the vulcanizing chamber.

It is believed that a complete understanding of the invention will be had from the following detailed description, reference being had to the accompanying drawing, wherein Fig. 1 is a diagrammatic elevational view, partly in section, of one form of core sheathing apparatus embodying the features of the invention;

Fig. 2 is an enlarged fragmentary section on line 2—2 of Fig. 1;

Fig. 3 is a detailed view of the core tube assembly;

Fig. 4 is an enlarged sectional view of a pair of conductors coated by the apparatus shown in Figs. 1 and 2; and Fig. 5 is a similar view showing a modified form of the same.

Referring now to the drawing wherein like reference numerals designate corresponding parts throughout the several views, the reference numeral 9 designates the extrusion head of an apparatus adapted to apply a common coating of rubber compound or other material 10 to wires 11 and 12 which pass therethrough from supply reels 13, 14 and 15, the supply reels being so mounted with respect to the extrusion machine that when one reel becomes exhausted the wire from another reel may be threaded into the machine without removing the exhausted reel. From the extrusion head, the newly coated wires are passed to a chamber 16, where steam or other heating medium is admitted thereto through an inlet 17, the heating medium being maintained under pressure in the chamber. From chamber 16 the coated and heat treated wires pass through a substantially steam-tight seal 18, and thence over a capstan 19 to a take-up reel 20. The capstan 19 is driven, by means not shown, at a predetermined speed which is coordinated with the extruding speed of the extrusion head 9.

The seal 18 comprises a threaded cap 21 which holds apertured discs 22, of rubber or other resilient material, against the end of the steam chamber 16. A hollow cylindrical retaining member 25 holds the discs 22 in yielding contact with the coated wires 11 and 12 moving therethrough, to prevent leakage of the steam from the chamber. The retaining member 25 is held in position by a bell-crank lever 26 which is yieldingly urged against the retaining member by means of a piston 27 mounted in a cylinder 28 and actuated by compressed air or other pressure medium admitted through duct 29, the piston being yieldingly urged upwardly by a coiled spring 24.

The rear or entrance end of chamber 16 connects, through a head block 30 (Fig. 2), with a tapered entrance member 31 which bears against a floating coating or extrusion die 32 of the insulating head 9, a gasket 34, preferably of asbestos fibre saturated with graphite, or of soft copper, aluminum, or other suitable gasket material, being interposed between the entrance member and the die to prevent leakage of steam. A steam-tight seal between the die and the chamber 16 is thereby maintained during the operation of the machine by reason of the die being pressed forwardly against the entrance member by the pressure of the coating material 10 being forced therethrough by a conveying screw 33. The floating die 32 has at its inner end a throat 101 with a conical shaped opening which communicates with a small aperture 102 having the ultimate configuration of the outer surface of the covered wires 10 and 11.

The core tube assembly (Fig. 3) comprises a member or core tube holder 35 having a concave surface 54 to deflect the insulating material toward die 32, and having a central partition member 36 adapted to divide the stream of insulating material into two portions and thereby evenly distribute the pressure thereof. A pair of core tubes 37 are fixedly mounted within member 36, extending forwardly therefrom, and are shaped to receive wires 11 and 12 and to cooperate with die 32 to form thereon a common insulating covering, which covering is preferably shaped to indicate polarity, by means of spaced, longitudinally extending fins 45 as shown in Fig. 4, or by means of a flattened surface 46, as shown in Fig. 5. As shown in Fig. 2 the core tubes 37 extend forward into the throat 101 of the die 32 to the point at which the throat 101 joins the aperture 102. At this point in the die the covering material 10 is moving therethrough at approximately the same rate of speed as it moves through the outer end of the die. This makes it possible to insert a new length of wire through either of the core tubes 37 to a point where the insulating material 10 will grab the end of the new wire and carry it through the die at approximately the same speed as the completed product is propelled by the capstan 19. When the relation of the ends of the core tubes 37 and throat 101 is as shown it becomes unnecessary to stop the operation of the machine each time one of the spools of wire 13 or 14 becomes exhausted. Members 32 and 35 are slidably mounted in a cylindrical opening or bore 38 formed in a die holding block 39 of the extrusion head, a stop or aligning plate 40 being fixed in the bore to coact with lugs 41 and 42 on the members 32 and 35 to limit their inward movement. Block 39 has a cylindrical outer surface except at opposite faces 43 and 44 which are formed plane in order to align the block 39 accurately within the block 30. The die holding block 39 constructed as shown and above described has two flat faces 43 and 44 parallel to each other, and two terete faces between the flat faces 43 and 44, all of which are in contact with corresponding inner surfaces of the block 30. The die holding block 39 has another pair of flat faces 48 and 49 which are perpendicular to the flat faces 43 and 44. A flange or externally threaded nut 50 is threaded into the head block 30 of the extrusion head 9 and bears against the flat face 49 of the die holding block 39 to securely hold the block 39 in its proper position. In order to prevent the parts from being incorrectly assembled, the face 43 is made slightly smaller than the face 44, as indicated in Fig. 1, while the opposite ends of stop 40 are spaced at different distances from surfaces 43 and 44, respectively, as indicated in Fig. 2. It will thus be seen that the block 39 cannot be inserted within block 30 except in a predetermined position, and that it cannot be so inserted when members 32 and 35 are improperly positioned therein.

While the invention has been described with particular reference to an apparatus for extruding and vulcanizing a common covering upon a pair of wires, it will be readily understood that it may be applied with suitable modifications to apparatus for sheathing a single wire as well as more than two wires, and that it may be applied to apparatus for sheathing cores with material other than rubber. The scope of the invention is therefore to be limited only by the terms of the following claims.

What is claimed is:

1. In an extrusion machine, a member having opposed faces of different shape and adapted to seat within a cooperating member having correspondingly shaped inner surfaces, the first mentioned member being provided with a bore connecting said faces, and a pair of die members slidably mounted within said bore and adapted to be pressed against said surfaces by the pressure of the material being extruded.

2. In an extrusion head for applying a coating of insulating material upon a core, a head block, a second or die holding block mounted within said head block and having a cylindrical opening therein, a core tube holder removably mounted in one end of the cylindrical opening of the die holding block, an extrusion die removably mounted in the other end of the cylindrical opening in the die holding block, and a stop or aligning plate mounted within the cylindrical opening for preventing the improper assembly of said die and said core tube holder in the cylindrical opening of said die holding block.

3. In an extrusion head for applying a coating of insulating material upon a core, a die holding block having two flat faces and a terete face, a head block having one aperture therein arranged to engage said three faces of the die holding block, and a second aperture therein to provide communicatiin between one of the flat faces on said die holding block through said head block, said die holding block having a cylindrical bore therein, a core tube holder removably mounted in one end of the cylindrical bore in the die holding block, and an extrusion die removably mounted in the other end of the cylindrical bore of the die holding block.

4. In an extrusion head for applying a common coating of insulating material upon a plurality of cores, a head block, a second or die holding block removably mounted within said head block and having a cylindrical bore therein, a plurality of core tubes, a holder for said core tubes removably mounted in one end of the cylindrical bore of the die holding block, an extrusion die having an opening corresponding to the ultimate configuration of the outer surface of the covering and removably mounted in the other end of the cylindrical bore of the die holding block, and a stop or aligning plate mounted within the cylindrical bore to insure proper alignment between said core tubes and the opening in said extrusion die.

5. In an extrusion head for applying a coating of insulating material upon a core, a head block having a flat inner face and an opening extending from said face through said block, a second or die holding block having a flat outer face and a cylindrical opening extending therefrom through said die holding block, an extrusion die removably mounted in the cylindrical opening in said die holding block, said head block and said die holding block arranged to assemble the die holding block in position in the head block by moving the die holding block perpendicular to the cylindrical opening therein whereby the face of said die holding block is in contact with the face of said head block.

6. In an apparatus for applying a plastic covering material under pressure to a core, a sealed chamber adapted to receive the covered core, and a mechanism comprising a floating die, a head block adapted to receive said die by movement of said die in a direction transverse to the aperture in the die, and having an apertured wall between said die and said sealed chamber, means for applying pressure to the plastic covering material to force it through the die, and means adapted to cooperate with the die to form a seal whereby said die is yieldingly urged against the wall by the pressure of the covering material.

7. In an apparatus for applying a covering material under pressure to a core, an elongated closed chamber adapted to receive the covered core, and a mechanism comprising a longitudinally movable die, a head block adapted to receive said die by movement of said die in a direction transverse to the aperture in the die, and having an apertured wall between said die and said closed chamber, means for applying pressure to the plastic covering material to force it through the die, and means adapted to cooperate with said die on one side of the wall to form a seal whereby said die is yieldingly urged toward said side by the pressure of the covering material.

8. In an apparatus for applying covering material under pressure to a core, a sealed chamber for receiving the core, and a mechanism comprising a die, a head block adapted to receive said die by movement of said die in a direction transverse to the aperture in the die, and having an apertured wall between said die and said sealed chamber, means for applying pressure to the plastic covering material to force it through the die, said die movable with respect to the chamber and urged against the wall by the pressure of the covering material and a gasket interposed between said die and said wall to provide a seal between the die and the chamber.

9. In an apparatus for applying covering material under pressure to a core, a chamber having an opening for receiving the core, and a mechanism comprising an apertured member, a head block adapted to receive said apertured member by movement thereof in a direction transverse to the aperture in the die, and having an apertured wall between said apertured member and said chamber, means for applying pressure to said covering material to force it through the apertured member, said apertured member communicating with the chamber through the aperture in the wall and movable with respect thereto and having a yielding connection as said member is urged against the wall by the pressure of the covering material to provide a seal between the member and the chamber.

10. In an apparatus for extruding plastic covering material upon a core, a chamber having an opening for receiving the core, and a mechanism comprising an apertured block communicating with the chamber, a die holder having opposed faces of different shape mounted within the block and having an aperture communicating with the chamber through the block, an extrusion die slidable within the aperture of the die holder and yieldingly urged toward the chamber by the pressure of the material being extruded, to thereby cooperate with the block to provide a seal for the chamber.

GEORGE L. CHERRY.